(12) United States Patent
Cope et al.

(10) Patent No.: US 9,900,397 B1
(45) Date of Patent: Feb. 20, 2018

(54) SYSTEM AND METHOD FOR SCALE-OUT NODE-LOCAL DATA CACHING USING NETWORK-ATTACHED NON-VOLATILE MEMORIES

(71) Applicant: DATADIRECT NETWORKS, INC., Chatsworth, CA (US)

(72) Inventors: Jason M. Cope, Highland, MD (US);
Michael J. Piszczek, Laurel, MD (US);
Pavan Kumar Uppu, Woodbine, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 224 days.

(21) Appl. No.: 15/016,774

(22) Filed: Feb. 5, 2016

(51) Int. Cl.
*H04L 29/08* (2006.01)
*G06F 3/06* (2006.01)
*H04L 29/06* (2006.01)

(52) U.S. Cl.
CPC .......... *H04L 67/2842* (2013.01); *G06F 3/067* (2013.01); *G06F 3/0622* (2013.01); *G06F 3/0647* (2013.01); *G06F 3/0688* (2013.01); *H04L 63/10* (2013.01); *H04L 67/1097* (2013.01); *H04L 67/32* (2013.01)

(58) Field of Classification Search
CPC .................. H04L 67/2841; H04L 67/1097
USPC .......................................... 709/213
See application file for complete search history.

(56) References Cited

U.S. PATENT DOCUMENTS

| 7,987,383 B1* | 7/2011 | Coatney | ................ | G06F 11/006 709/226 |
| 2015/0046754 A1* | 2/2015 | Nagahama | .......... | G06F 11/0706 714/38.11 |

* cited by examiner

*Primary Examiner* — Adnan Mirza
(74) *Attorney, Agent, or Firm* — Rosenberg, Klein & Lee

(57) ABSTRACT

The system and routine for data caching leverages the properties of Network-Attached Non-Volatile Memories (NANVMs) to provide virtualized secure node-local storage services to the network users with reduced data movement across the NANVMs. The caching routine reserves storage resources (storage partitions) on NANVM devices, migrates data required for the target application execution to the allocated storage partitions, and directs the network clients to dynamically "mount" to the storage partitions based on application data requirements. Only those clients and applications that present valid credentials and satisfactory computing capabilities can access the data in the specific storage partitions. Several clients can have an access to the same storage partitions without duplication or replicating the data. A Global Data Indexing sub-system supports the efficient operation of the subject system. The Global Data Indexing Sub-System provides mapping between the storage partitions, data sets, applications, client nodes, as well as their credentials/capabilities.

20 Claims, 8 Drawing Sheets

SYSTEM AND METHOD FOR SCALE-OUT NODE-LOCAL DATA CACHING USING NETWORK-ATTACHED NON-VOLATILE MEMORIES

FIELD OF THE INVENTION

The present system and method is directed to network-attached storage architecture, and in particular, to an efficient node-local storage and global indexing of data stored across a node-local storage tier, attaining significant reduction in data migration load and providing compartmentalization (isolation) of data from other users and resource reservations (storage capacity, latency/bandwidth) without additional external tools and services.

More in particular, the present invention is directed to a storage system and method for data caching using network-attached storage where a significant improvement in the system performance is attained by minimizing (and substantially eliminating) data movement associated with migrating data to specific node-local storage devices. By eliminating the bulk data movement (once loaded in the system), the present system and method obviate a significant source of application jitter and require fewer network and node-local resources to be built upon physical storage devices.

The present invention is also directed to a system and method leveraging the properties of Network-Attached Non-Volatile Memories (NANVMs) to provide virtualized node-local storage services to the storage system's clients and network users.

The present invention is further directed to node-local data caching technique using network-attached storage where the data placement tasks provided by the caching layer are decoupled from the data access pattern invoked by the storage system clients and applications.

In overall concept, the present invention is directed to an efficient data caching routine and a system underlying the routine in question which uses a network-attached storage (NAS) where data is compartmentalized for secure computing environments, and where data is placed on the NAS device in a unique manner, so that only clients and applications that present valid credentials and satisfactory computing capabilities can access the data. The subject system reserves storage partitions on the NAS nodes and permits the allocated partitions to be "mounted", or connected, to the application hosts (or applications), based on the mapping and requirements of a target application requested by a network user. The storage partitions can be mounted onto multiple hosts to increase the throughput through virtual data replication without physical replicating data in the NAS tier.

BACKGROUND OF THE INVENTION

Data is a critical asset for companies. Without access to data, companies may not be able to provide their customers with the level of service desired. When it comes to a data storage, businesses find themselves facing issues, such as the requirements that their storage solution be cost effective, easy to operate, as well as being capable of growing alongside their storage needs. Network Attached Storage (NAS) has rapidly become popular with enterprises and small businesses in many industries as an effective, scalable, low cost storage solution, and as a convenient method of sharing files among multiple computers.

The Network Attached Storage device is a storage server attached to a computer network that allows storage and retrieval of data from a centralized location (archives, databases, etc.) for authorized network users and heterogeneous clients.

Network Attached Storage removes the responsibility of file serving from other servers on the network. They typically provide access to files using a number of network file sharing protocols.

Although the internet protocol IP is a common data transport protocol for NAS architectures, some mid-market NAS products may support the network file system (NFS), internet or packet exchange (IPX) and ETBIOS extended user interface (NETBEUI) or common internet file system (CIFS) protocols. High-end NAS products may support gigabit Ethernet (GigE) for even faster data transfer across the network.

In the NAS architecture, corporate information resides in a storage system that is attached to a dedicated server, which, in turn, is directly connected to a network, and uses a common communication protocol, such as TCP/IP. In a corporate team structure, the NAS operates as a server in a typical client-server environment. The NAS may be connected to a network by standard connectivity options such as Ethernet, FDDI, and ATM. In some cases, a single specialized NAS server can have up to 30 Ethernet connections.

Clustered NAS, i.e., the NAS that uses a distributed file system running simultaneously on multiple servers is gaining popularity. The clustered NAS, similar to a traditional NAS, provides unified access to the files from any of the cluster nodes, unrelated to the actual location of the data.

NAS devices, which typically do not have a keyboard or display, are configured and managed with a browser-based utility program. Each NAS resides on the computer network (for example, LAN) as an independent network node and has its own IP address.

An important benefit of NAS is its ability to provide multiple clients on the network with access to the same files. When more storage capacity is required, the NAS appliance can simply be outfitted with larger disks or clustered together to provide both vertical scalability and horizontal scalability. Many NAS vendors partner with cloud storage providers to provide customers with an extra layer of redundancy for backing up files.

Some higher-end NAS products can hold enough disks to support RAID which is a storage technology that turns multiple hard disks into one logical unit in order to provide better performance times, high availability, and redundancy.

Recently, the baseline functionality of NAS devices has broadened to support virtualization. High-end NAS products may also support data deduplication, flash storage, multi-protocol access, and replication.

FIG. 1 is representative of a Network-Attached Storage topology where clients, servers, and the Network-Attached Storage are interconnected into a local area network (LAN). The devices (clients, NAS, servers) are considered nodes in the LAN which may be interrelated through the Ethernet switch.

NAS is not always suitable for applications such as data warehouses and on-line transaction processing, since these applications need to sustain high I/O data rates with little (or zero) degradation in response times to the clients.

Another disadvantage of existing NAS data migration strategies is that during data movement associated with migrating data to specific node-local storage devices, all the data (bulk data must be migrated which is a significant source of application jitter requiring involvement of a high volume of network resources.

Specifically, with a pool of network attached storage, a conventional protocol of data caching assumes moving all data into a single storage pool that is globally accessed by any client. This approach typically provides no means for compartmentalizing (aka isolating) the data from other users or for resource reservations (such as storage capacity, latency/bandwidth) without additional external tools (such as quota managers, as well as quality of service tools built into the NAS).

With the physical node-local storage, the conventional protocol tries to make a best effort in data placement when moving data to the client hosts. Due to the fact that it is difficult to accurately predict a specific client for the application executing, the data is possibly placed on a wrong client host. In this case, protocol is burdened with the necessity to move data from the incorrect host to a correct host, thus creating unnecessary extra date migration load which is detrimental to the NAS system performance.

The removal of unnecessary bulk data movement across the storage tiers in NAS devices and decoupling the data placement tasks provided by the caching layer (NAS servers) from the data access pattern invoked by the storage system clients and applications, would be highly beneficial for the otherwise tremendously useful NAS technology.

SUMMARY OF THE INVENTION

It is an object of the present invention to provide a system and method for scale-out node-local data caching using Network Attached Non-Volatile memories (NANVM) which minimizes (or possibly eliminates) unnecessary bulk data movement associated with migrating data to specific node-local storage devices, and where the data is compartmentalized in a secure computing environment.

Another object of the present invention is to provide a data storage system supporting an efficient and secure caching protocol, in which data needed for an application execution is placed on NAS devices at pre-reserved (or pre-allocated) storage resources (storage partitions). Only clients and applications that present valid credentials and satisfactory capabilities are directed to the storage targets (location of the data in a particular storage partition in the NAS devices) for the applications data-related tasks based on the global indexing mapping and requirements of the target applications requested by network users.

It is a further object of the present invention to provide efficient data caching using global indexing of data stored across a node-local storage tier which leverages the properties of Network-Attached Non-Volatile Memories (NANVM) to provide virtualized node-local storage services to the network users.

Another object of the present invention is to provide a function shipping data—intensive architecture with improved caching capability where the caching routine is configured to reserve space on the NAS devices, and "mount" (or "connect") to the data pre-staged in the allocated storage partitions based on the global index mapping and requirements of the target application. Storage partitions can be "mounted" onto multiple client hosts to increase the throughput of multiple (parallel) computations through virtual data replication without physically replicating additional data in the NANVM storage tier.

It is a further object of the present invention to provide a data-intensive system using Network Attached Storage (NAS) where data caching protocol frees the system from unnecessary bulk data migration once data is loaded in the NAS, and where, instead of moving bulk data to the application host, the host "mounts" to the storage target (storage partitions) pre-stage prior to the application execution for the application data related tasks.

It is an additional object of the present invention to provide a data caching protocol supported by the NAS system where only a client submitting valid credentials and computing capabilities, can "mount" (or connect) to the storage partitions previously used by the failed client with no additional bulk data movement required.

In one respect, the present invention is directed to a method for data caching using Network-Attached storage which comprises the following steps:

(a) connecting a plurality of client hosts (also referred to herein as client nodes, application hosts, or compute nodes) into a computer network system, where each client host is configured to execute at least one application, and operatively coupling at least one Network-Attached storage (NAS) node to the computer network system, where the NAS node includes an array of Non-Volatile Memory (NVM) devices arranged in rows and tiers, and operatively connecting at least one network user to the computer network system.

Upon receiving a request from a network user identifying at least one target application to be executed, a caching routine is performed to allocate a plurality of storage partitions in the NAS node. The caching routine subsequently migrates data required for the target application execution into at least one of the pre-allocated storage partitions.

Subsequently, a Global Data Index sub-system is actuated to generate a partition map where the storage partition and the data stored are mapped.

The subject caching routine (protocol) continues with choosing a respective application host from the plurality of compute nodes in the computer network system for execution of the target application. A Resource Manager/Scheduler tool is used to allocate the application host to the target application execution. The Resource Manager/Scheduler co-operates with the Global Data Index sub-system, and with a Service Node (Server), which supports the subject caching routine.

The subject routine requests security credentials of the chosen application host, submits the security credentials to the Global Data Index sub-system, and permits access for the host to the storage partition in question if the security credentials are valid.

The subject routine further requests information on the computing capabilities of the chosen host, transmits the information to the Global Data Index sub-system, and permits access to the storage partition in question if the computing capabilities of the application host meet the target application requirements.

The subject routine in cooperation with the Resource Manager/Scheduler selects another application host for accessing the storage partitions in question based on the security credentials and the computing capabilities of another host if the credentials are capabilities of the chosen host are not satisfactory.

Upon selecting the compute node to run the target application, the subject routine operatively couples the compute node to the storage partition(s) containing the data needed for executing the target application, and particularly, to the storage target in the allocated partitions, i.e., the location of the data in question in the partitions.

For performing the storage partitions allocation, the subject routine actuates a Partition/Allocator Manager Sub-System (preferably, residing in the Service Server) to dynamically control the allocation of the storage partitions for the target application execution.

The subject routine also actuates a Data-Structure and Data-Model Aware Data Migration Sub-System (preferably, residing with the Service Node in operative interconnection with the Partition/Allocator Manager) for analyzing characteristics, geometry, and the data model of the data, and for generating an optimization strategy for optimized allocation of the storage partitions and optimized storage of the data in accordance with characteristics, geometry and the data model of the data.

Subsequently to the target application execution termination, or once the host shuts down or fails, the subject routine disconnects the application host from the storage partition(s) in question.

During the subject routine execution, the Global Data Index Sub-System operates to develop a dynamic partitions map which includes the target application mapping to the application host, the storage partitions mapping to the application host, the storage partitions mapping to the data, map the credentials and capabilities of the application host to the storage partitions, and map the execution resources of the application host to the storage partitions.

Prior to coupling the selected application host to the data, the subject routine queries the Global Data Index Sub-System to determine a location of the data in the NAS node.

During failure situations, including failure of the target application or the failure of the selected application host, the subject routine determines (using the partition map in the Global Data Index Sub-System) storage partitions mapped to the application host, and reassigns the storage partitions to another application host which provides valid credentials and capabilities.

The subject routine may perform the indexing in a number of ways, including indexing a plurality of storage partitions in the Global Data Index Sub-System in an online mode adapted for global visibility of the data across multiple application hosts accessing the data. Alternatively, a disconnected mode indexing is used which is adapted for local visibility of the data.

The subject routine is capable of allowing access to the same storage partition for at least two hosts for parallel read-only I/O operations.

The subject routine is additionally designed for allocating additional storage partitions for storage of data results generated by the application host during the target application execution, and coupling the additional data partitions to the host in question. The additional data partitions are exclusively used in read and write modes by the application host.

The subject routine may allocate storage partitions on a per-target-application basis, as well as on a file-per-process application basis. For the file-per-process scenario, the clustered data partitions are allocated, and the data set is migrated (as a single file) to the clustered data partitions.

In the case where the data set includes a number of sub-objects, the subject routine slices the data set into a number of sub-objects, migrates each sub-object to a respective storage partition, and maps each sub-object to a respective storage partition.

In another aspect, the present invention is a data migration system, which may have a data intensive architecture or high performance computing architecture.

The data migration system includes a network of interconnected client nodes, each configured for execution of at least one application, and at least one Network-Attached storage (NAS) node operatively coupled to the network of the client nodes.

The subject system further includes a Global Data Index Sub-System operatively coupled to the NAS node and the network. A number of network users are operatively connected to the network.

The system further includes a Service Node (Server) coupled to the Global Data Index Sub-System and the network and configured with a Partition/Allocator Manager unit coupled to the NAS node and a Data Migration Sub-System coupled to the Partition/Allocator Manager unit. A Dynamic Mounting Mechanism is operatively coupled to the Data Migration unit and the Partition/Allocator Manager and preferably resides with the Service Node.

Upon receipt of an application request from a network user, a plurality of data partitions are dynamically allocated in the NAS node by the Partition/Allocator Manager based on the target application data requirements. The data requirements may include memory capacity of the storage partitions, global bandwidth/latency, local bandwidth/latency of the client nodes, and duration of the storage partitions allocation/reservation.

Subsequent to the storage partitions allocation, the Data Migrating facility migrates at least one data set from a centralized storage or any storage external to the NAS (for example, an archive or database) to the NAS node, and stores the data set(s) in the allocated storage partition(s) for the target application execution in an optimized format controlled by the Data Migration unit in accordance with the characteristics, geometry and the data model of the data set.

The Resource Manager/Scheduler is included in the subject system to choose (in logical co-operation with the Service Server and Global Data index service) at least one application host from the network for execution of the target application. In choosing the application host, security credentials and the computing capabilities of the potential application host are verified. Once the host is assigned and application execution resources are allocated, the Dynamic mounting mechanism operatively couples the selected application node to the storage partitions containing the data set for executing the target application.

The Global Data Index Sub-System contains a partitions map built with the mapping of the data set, storage partitions, target application, and the application host.

In the subject system, the Service Server is further configured to determine the storage partitions mapped to the chosen application host, and to reassign the storage partitions to another application host during failure situations, including failure of the target application or the failure of the application host.

The subject system is further configured to allow an access to the same storage partitions to at least two hosts for read-only I/O operations.

These and other objects and advantages of the present invention will become apparent after reading further description of the preferred embodiment(s) in conjunction with accompanying Patent Drawings in the current Patent Application.

DETAILED DESCRIPTION OF THE PREFERRED EMBODIMENT

Figure 1:
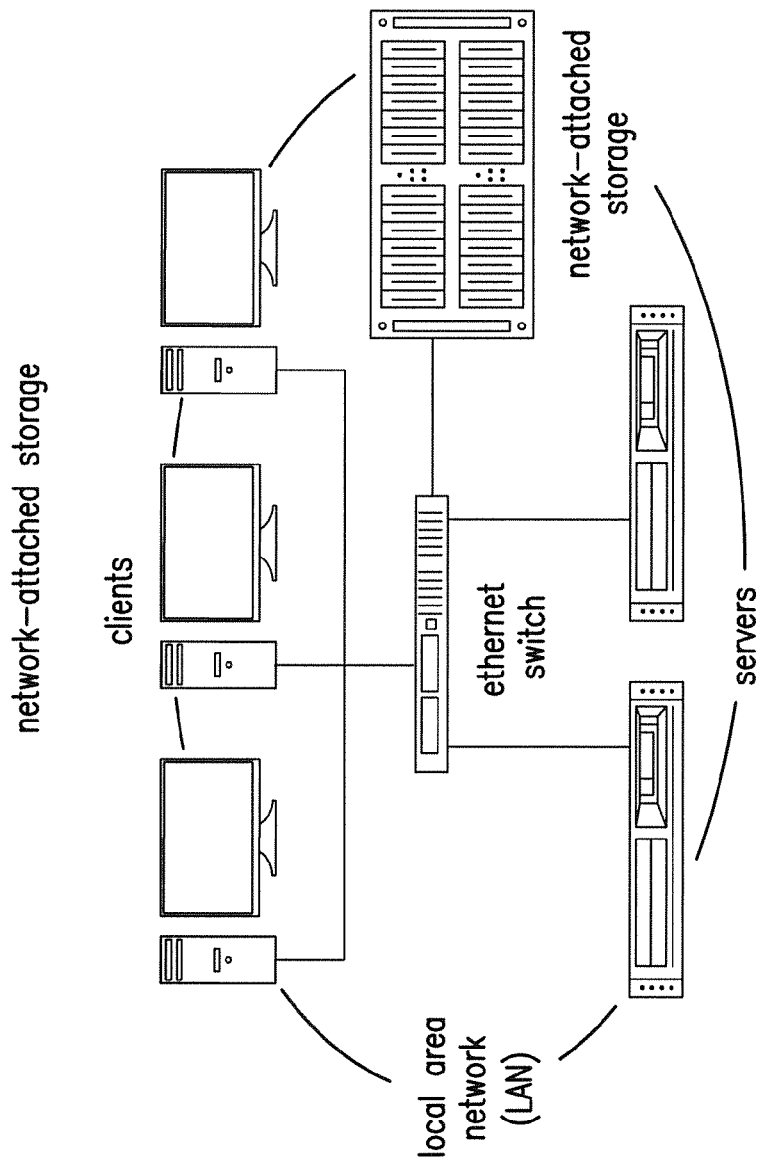
FIG. 1 is a network attached storage topology of the prior art.
Figure 2:
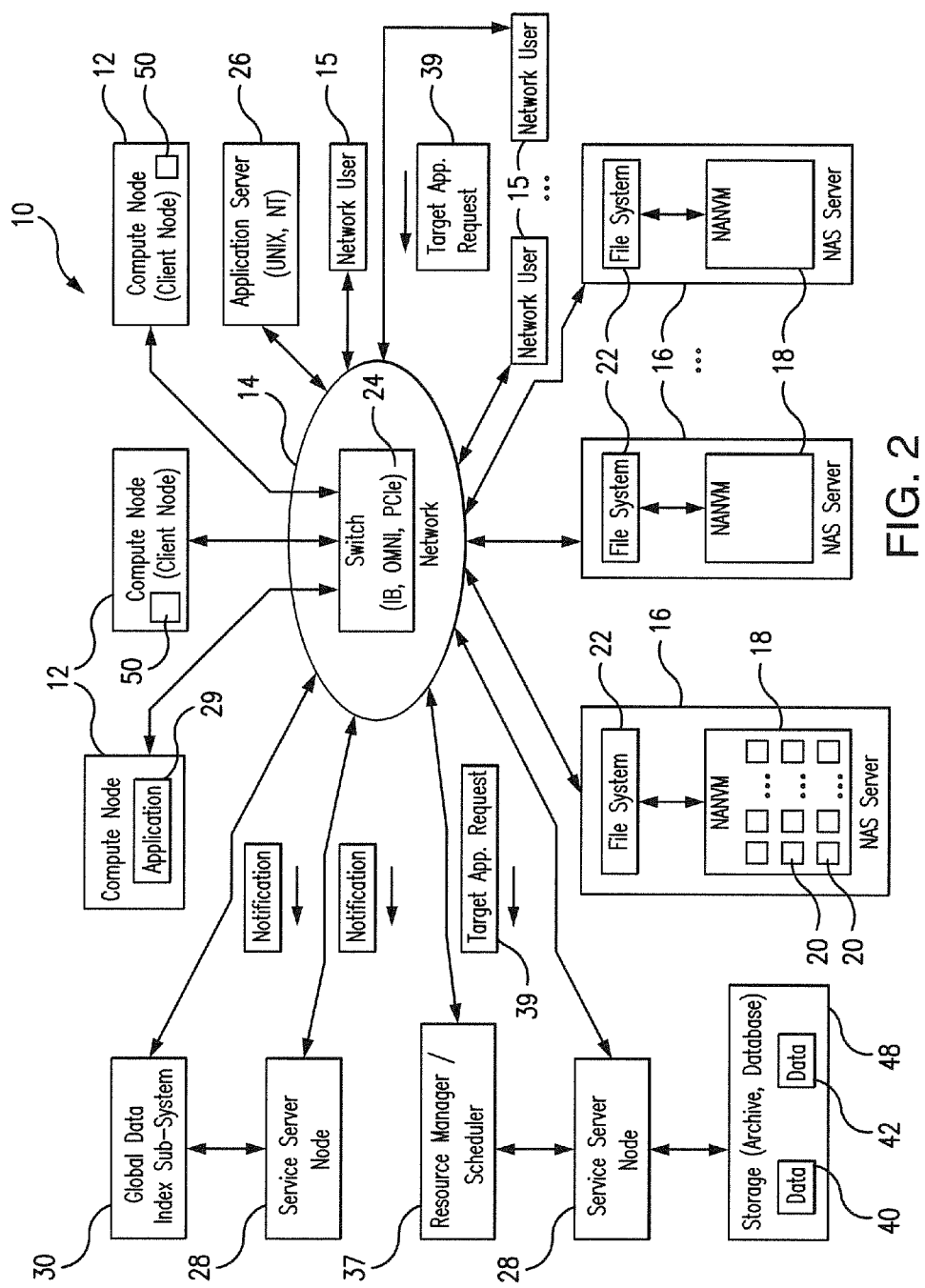
FIG. 2 is a simplified schematic representation of the subject system underlying the data caching process using the network attached non-volatile memory.

FIG. 2 is representative of a simplified schematic diagram of the subject Network Attached Storage topology. The subject system 10 includes a plurality of compute nodes 12 (also referred to herein as client hosts, client nodes, application hosts, or compute nodes) operationally interconnected into a network 14.

A number of NAS (Network Attached Storage) Servers 16 are included in (or attached to) the network 14 as network nodes, each with its own IP address.

Each NAS server 16 includes a Network Attached Storage (NAS) device 18 which, for example, may be based on an array of Non-Volatile Memory (NVM) devices 20. The NVM devices 20 may be arranged in rows and tiers, preferably into the logical redundant storage arrangement, such as various levels of RAID (Redundant Array of Independent Disks) technology.

Examples of non-volatile memory devices 20 may include read-only memory, flash memory, Ferro-electric RAM (F-RAM), most types of magnetic computer storage devices, e.g., hard disk drives, floppy disks, and magnetic state, optical disks, and other non-volatile memory devices, which may be used, for example, as a secondary storage or long-term persistent storage.

Each NAS server 16 also includes a File System 22, which uses a file-based protocol such as, for example, NFS or Microsoft Common Internet File System (CIFS). Both of these protocols, i.e., NFS and CIFS, allow storing back-ups using UNIX and LINUX servers. Other file systems also are contemplated in the subject system for operations with NAS architectures, such as, for example, ZFS (built by Sun MicroSystems) which have the features of endless scalability supporting capability of managing zettabytes (one billion terabytes of data), high level of integrity, the capability of adding hard drive space when needed, and capability of many different RAID levels. Other file systems (EXT2, EXT3, XFS, EXT4, REISERFS, JFS, VFAT, SWAP, and others) can also be used for operation with the NAS devices 18 in the present system.

In the subject system 10, all nodes in the network 14, i.e., application hosts (compute nodes, client hosts) 12, NAS servers 16, and other storage devices are interconnected and communicate through a switch 24 which may be any of switching/interconnection systems, including but not limited to IB (InfiniBand), OMNI, PCIe, Ethernet switch, Fibre Channel, or other types of interconnects satisfying the requirements of data intensive architectures.

PCIe (PCI Express) switch delivers high performance and scalability, enables flexible system scaling, and optimal resource utilization, and is well-suited for high performance architectures. OMNI switch is highly customizable, supports applications control and provides ease in application switching.

Application servers 26 are connected to the network 14 and are configured with capabilities for accessing other nodes of the network 14, as well as the users 15 of the network 14.

The principles of the subject system and method are applicable to different networks. For example, the network 14 may be a Local Area Network (LAN), which connects devices over a relatively short distance. The subject network 14 may operate in a networked office building, school, or home, which may contain a single LAN, or a few small LANs (perhaps one per room), and may span a group of nearby buildings.

As an example, the network 14 can be TCP/IP, Fibre channel networks, Infiniband, Omni-path, or other RDMA-capable network. In the TCP/IP networking, a LAN may be implemented as a single fabric operating in a single IP subnet.

In addition to operating in a limited space, the LAN 14 may be owned, controlled, and managed by a single person or organization, and use certain connectivity technologies, primarily Ethernet and/or Token Ring (which is a communication protocol for LANs which uses a special three-byte frame ("token") that travels around a logical "ring" of workstations or servers (also referred to herein as network nodes).

The network 14 may be also a Wide Area Network (WAN), for example, the Internet. A WAN is a geographically dispersed collection of LANs. A router may be included in the system for connecting LANs to a WAN. In IP networking, the router maintains both a LAN address and a WAN address.

In addition to the LAN and WAN, network 14 may be a wireless local area network, i.e., a LAN based on Wi-Fi wireless network technology, Metropolitan Area Network (MAN), i.e., a network spanning a physical area larger than a LAN, but smaller than a WAN, such as for example a city, Campus Area Network (CAN), i.e., a network spanning multiple LANs, but smaller than a MAN, such as on a University or local business campus. Additionally, the Storage area network (SAN) which connects servers to data storage devices through a technology like fibre channel, may be considered as the network in the subject system, as well as the System Area Network, also known as cluster area network, which links high performance computers with high speed connections in a cluster configuration.

As an example, but not to limit the scope of protection for the subject system and method to this particular application, the network 14 will be further referred to and described as a local area network.

A collection of network users 15, i.e., computers, mobile phones, gaming consoles, printer, smart phones, and tables, TiVo DVRs, etc., are connected to the network 14, and thus are operatively interconnected through the switch 24 and the fabric of the network 14. Every device 15 on the network 14 can communicate (or "talk") to every other device.

In the subject network system, the switching 24 device is used for interconnection of the network nodes, storages, various servers, and network users. The switching device 24 connecting each device in the network 14 may be in a form of a router, modem, or a switch. A modem is used to turn the proprietary network signal of each device (running through a phone line, copper, coaxial, or glass fiber) into a standard computer network signal. A router acts as a central point of contact between every device in the network, and the internet connection provided by the modem. All modern routers include Wi-Fi connectivity plus a number of LAN ports. The router may plug into the modem through an Ethernet cable using the WAN port on the router. Switches (and hubs) are used to extend a network, taking one port of the router and turning it into many more ports. The switch 24 may be unmanaged (i.e., not configurable), or managed, which can be set up with different features which are prioritized.

One or more application servers 26 are connected to the network 14 and are configured with capabilities for accessing other nodes of the network 14, as well as the network users 15.

In the subject system, all nodes in the network 14, i.e., application hosts (compute nodes, client hosts) 12, NAS servers 16, other storage devices, application servers 26, service servers 28, as well as the network users 15, are interconnected and communicate through the switch 24 which may be an IB, OMNI, PCIe switch or any other switch satisfying the requirements of data intensive architectures.

In the system 10, the application hosts (compute nodes, client nodes, data generating utilities) are referred also as a computing tier, while the NAS servers are referred to as a storage tier. A cache managing sub-system (cache tier) operates to support the subject caching routine. The cache managing tier in the subject system may be configured with one or more Service nodes 28 which control the caching of data in the unique manner described herein.

The subject system and method support a data caching routine which attains an efficient node-local storage and global indexing of data across a node-local storage tier by leveraging the properties of Network-Attached Non-Volatile Memories (NANVMs) to provide virtualized node-local storage services to the storage system's clients.

The motivating principle of the subject data caching routine is the minimization (or complete removal) of unnecessary data movement across the storage tier in the Network-Attached Storage Architecture. This is attained through configuring the subject system with the ability to reserve storage resources (storage partitions) in the NANVM devices, move data necessary for applications execution to the reserved storage partitions, and direct clients (application hosts) to the location of the data to dynamically "mount" (or connect) the clients to the network attached storage partitions based on the target application data requirements.

The subject technique decouples the data placement tasks provided by the caching tier (Cache Manager) in the system from the data access pattern invoked by the clients of the storage system and applications, thus significantly reducing the data migration load in the system.

The present system and method provides a reduced data movement load, and specifically eliminates bulk data movement associated with migrating data to specific node-local storage devices.

Within the subject system, bulk data does not normally need to be migrated once loaded in the system from an external storage. Instead, clients "mount" (or "connect") to the necessary storage targets (storage partitions) formed in the NAS devices for the applications data-related tasks. By eliminating the bulk data movement, the subject caching routine removes a significant source of application jitter and avoids the usage of excessive physical network resources.

The routine supported by the subject system implicitly compartmentalizes data for secure computing environments. Data needed for applications execution is placed on NAS devices, and only clients and/or applications that present valid credentials and computing capabilities (which are satisfactory for processing the data in question for execution of the requested application), can access the data. As an example, technology specific capabilities, such as NVMe namespaces, can be leveraged to protect data from users who do not have valid credentials or capabilities.

In the subject system, a new client that is to replace a failed client must "mount" (or "connect") to the storage services used by the failed client (under provision of the valid credentials and capabilities). No additional bulk data movement is required for the clients replacement.

The subject system and method may be used to improve upon existing data-intensive and function shipping architectures. Users of the subject system reserve space on the Network Attached Storage (NAS) devices and "mount" (or "connect") to the allocated storage partitions based on the mapping and requirements of the application. Partitions may be "mounted" onto multiple hosts (users) to increase the throughput by multiple computations through virtual replication without physically replicating additional data in the NANVM (storage) tier.

Figure 3:
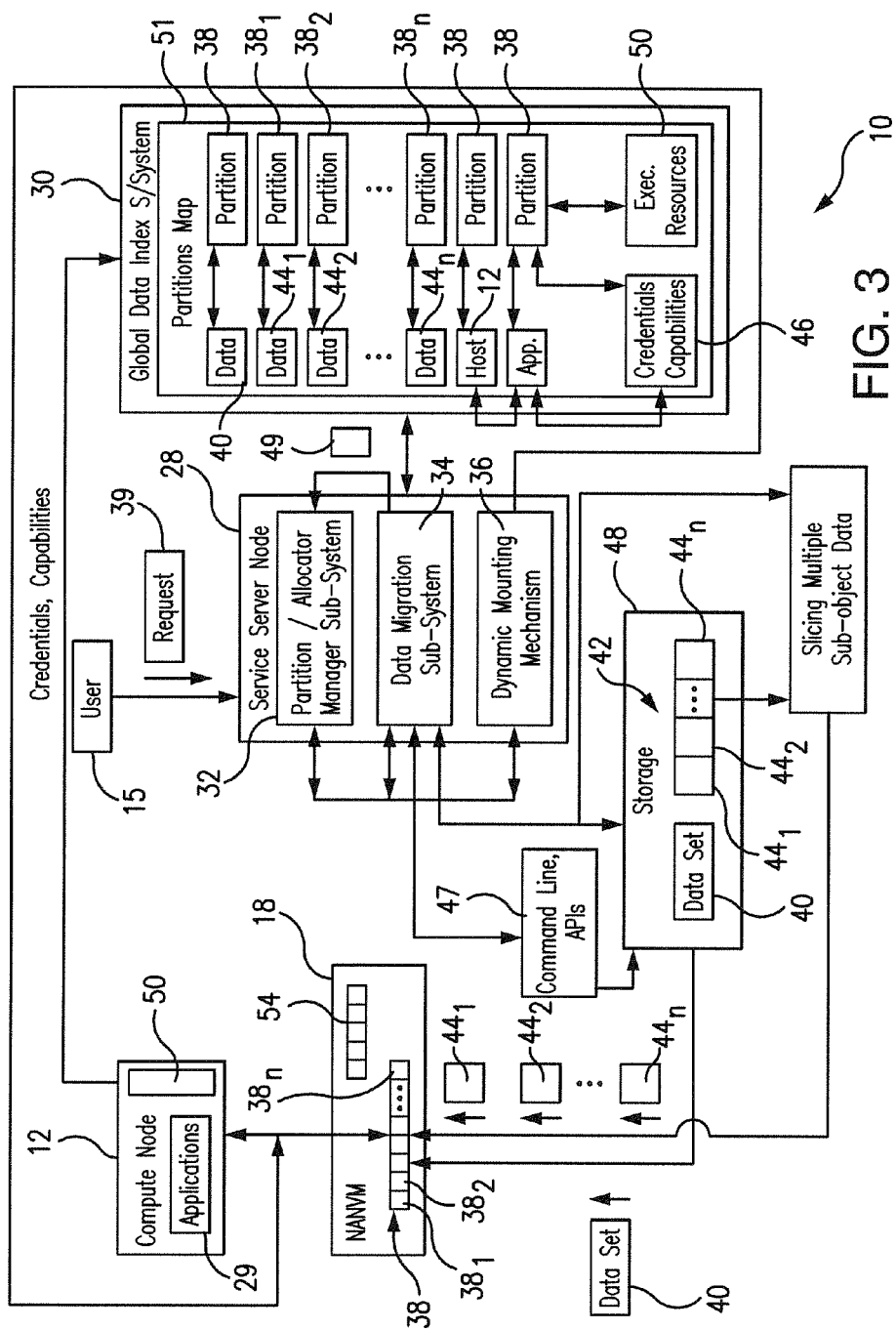
FIG. 3 is a schematic representation of the operative interconnections between devices in the subject system.

Referring to FIG. 3, representing an interconnection between the structural elements of the subject system architecture, and in conjunction with FIG. 2, the system 10 includes one or several Service Nodes (Servers) 28 which is (are) configured to interact with the applications 29, application hosts 12 (also referred to herein as compute nodes), and NAS servers 16, containing NANVM devices 20.

The present system 10 further includes a Global Data Index Sub-System 30 which supports the operation of the system 10 and the subject data caching routine. The Global Data Index Sub-System 30 may reside with the Cache Manager (not shown) or, alternatively, be a part of a separate server, i.e., the Service Node 28, shown in FIG. 2, and detailed in FIG. 3. The subject Service Server 28 may be configured as a part of the system's caching tier, i.e., the cache manager, or may be logically connected thereto.

As shown in one of the alternative embodiments, presented in FIG. 3, the Service Server 28 may be configured with the NANVM Partition/Allocator Manager sub-system 32, a Data-Structure and Data-Model aware Data Migration Sub-System 34, and a Dynamic "Mounting" mechanism 36, which are all logically interconnected within the Service Server 28, and are operatively interconnected through the switch 24 (or other specific interfacing mechanisms) with applications 29, application servers 26, network users 15, application hosts 12 in the network 14, the Global Data Index Sub-System 30, as well as the NAS servers 16, and various data storage facilities, such as external or centralized storages, databases, data archives, etc. as will be detailed in further paragraphs.

The Partition/Allocator Manager Sub-System 32 is logically and operatively connected to (or resides with) the Global Data Index Sub-System 30.

For a top-of-the-rack instantiation (shown in FIG. 4), both the Partition/Allocator Manager Sub-System 32 and the Global Data Index service 30 may reside on the Service Node 28.

As shown in FIGS. 2-3, in operation, a network user 15 submits a "target application run" request 39, which is supplied through the network switch 24 to a Resource Manager/Scheduler Sub-System 37. Subsequent to the "target application" request receipt at the Resource Manager/

Scheduler Sub-System 37, the Resource Manager/Scheduler 37 sends to the Global Data Index Sub-System 30 and the Partition/Allocator Manager 32 the notification information 41 to notify them on:

(a) what input files/objects are required by the target application to be pre-staged (move) onto the NANVMs 18, (b) the capacity/bandwidth of the input files/objects, (c) "hints" on how the files/objects should be organized on the storage partitions, i.e., whether the files/objects are to be co-located, striped, etc., and (d) the expected capacity/bandwidth requirements for output files/objects of the target application.

The notification information 41 is built by the Resource Manager/Scheduler 37 based on the information included in the target application request 39 issued by the network user 15, as well as the information related to the execution of the target application 29 which is obtained from the Application Servers 28, External Storage 48, NAS servers 16, and Compute Nodes 12.

The NANVM Partition/Allocator Manager Sub-System 32 is configured with the ability to dynamically virtually reserve (or allocate) storage partitions 38 (shown in FIGS. 3 and 5) having a storage capacity required for execution of the target application 29 suggested by the network user 15.

Storage partitions 38 are essentially portions of virtual NVM drives 20. The routine of allocating partitions for each application requires and assumes static and predetermined partition sizes for each target application execution. Sizing the partitions 38 can be, for example, based on the expected file/object/shard size, or the number of expected security/protection domains (compartments). If a large file/object is needed for the target application execution, it may be striped across a number of storage partitions 38.

Each storage partition 38 is a logical partition on a physical NVM device. The partitioning phase of the subject caching routine for the target application execution is performed during the configuration/deployment phase of the routine shown in FIG. 6.

The Partition/Allocator Manager 32 allocates the storage partitions 38 in the NANVM device 18 to optimize the capacity and bandwidth requirements, and directs the Global Data Index Service (as well as the Data Migration facility 34) to initiate data moving into the NANVM device 18.

The Partition/Allocator Manager 32 is coupled with the Global Data Index Sub-System 30 in which the data files/objects required for the target application execution are mapped to partitions (and vice versa). For example, as shown in FIG. 3, a partitions map is generated by the Global Data Index Service 30 which includes the mapping of a data set (or file) 40 to a storage partition 38.

The mapping between the data set (or the file) 40 and the storage partitions 38 supports the data security strategy provided by tracking which clients 12 and applications 29 have rights to access storage partitions 38. For this purpose, the Global Data Index Sub-System 30 builds the mapping between the hosts 12, applications 29, and their credentials/capabilities 46 and corresponding storage partitions 38 to which they are permitted to have access.

The Data Migration Sub-System 34 may be built into the cache manager of the system 10, and/or reside with the Service Server 28, in logical cooperation with the Partition/Allocator Manager 32. The Data Migration Sub-System 34 is configured with the ability to understand the runtime characteristics, geometry, and data model of the data set (file) 40 (shown in FIG. 3) that is loaded into the NANVM devices 20.

A data model defines how sub-sections of a data set 40 are to be placed on the storage partitions 38 based on the nature of the elements within the data set. For example, for a particular data set which contains Temperature data, Pressure data, and Velocity data, it may be desirable to co-locate the Pressure data and Velocity data on half of the allocated storage partitions, and the Temperature data on the other half of the reserved storage partitions in order to optimize data movement for efficient workflow.

In addition, if it is known (or defined in the data model) where (i.e., in which storage partitions), specific data sub-sections of the data set reside, the computation functions can be "shipped" to (or co-located with) the specific data sub-sections in order to further reduce the load associated with data movement in the system.

The geometry of the data set defines the placement of a whole data set based on the placement of the application. For example, storage partitions can be allocated such that all of the NANVM devices are physically located within a single rack in a data center, or across multiple racks in a data center.

The runtime characteristics define how sub-sections of a whole data set are placed on a number of storage partitions to ensure capacity and latency/bandwidth requirements for the target application.

For example, file-per-process applications will provide a "hint" to allocate clustered NANVM partitions for an application. In this situation, a single file of data will be migrated onto the cluster of partitions. This approach allows the file to be mapped onto the minimum set of partitions while still impedance matching the networking bandwidth available to the client (or application host) 12.

For an object 42 (shown in FIG. 3) that consists of n multiple sub-objects (variables or data sets), the data-structure and data-model aware Data Migration Sub-System 34 can intelligently slice and map the sub-objects $44_1$, $44_2, \ldots, 44_n$ to the storage partition targets $38_1, 38_2, \ldots, 38_n$, respectively, to maximize data access performance, availability, and reliability.

The data-structure and data-model aware Data Migration facility 34 accepts commands from the Partition/Allocator Manager Sub-System 32 to move data into or out of the NANVM partitions 38, or $38_1, 38_2, \ldots, 38_n$ (for the sub-object slices $44_1, 44_2, \ldots, 44_n$) for operations in the pre-stage, replay and/or purge phase(s) of the subject routine. The "intelligence" for the Data Migration facility 34 is derived from the network user defined "hints" (including the Runtime characteristics, geometry and data model) included in the target application request 39 that can help in steering (optimizing) partitions allocation/reservation and data placement.

The Data Migration facility 34 cooperates with some system tools (such as, for example, Command Line tools, APIs, etc.) 47 to move data from an external/centralized storage 48 into the allocated partitions 38.

The Dynamic "Mounting" (or accessing") Mechanism 36 is provided in the subject system for applications 29 executing on remote client hosts 12. The mechanism 36 may be built into the caching tier of the system 10, and/or may reside with the Service Server 29 in logical cooperation with the Partition/Allocator Manager 32 and the Data Migration facility 34. The Dynamic "Mounting" mechanism 36 establishes communication and data transfer capabilities to the storage partitions 38, and also provides a means for compartmentalizing data sets 40, 42.

In order for a client 12 or a target application 29 to access (or "mount", or connect to) the data in a specific storage partition 38, the client 12, as well as the application 29, must provide valid credentials and appropriate computing capabilities to the Global Data Index service 30. If the valid security credentials are not submitted, the data set 40, 42 in the corresponding storage partitions 38 cannot be accessed (or "mounted") by the client 12, or the target application 29.

During system shutdown, the target application 29, or the client 12, "disconnects" (or "unmounts") the storage partitions 38 it was using. This capability prevents the physical residency of sensitive data on the application hosts 12 which execute the target applications 29 with variable security requirements.

There are numerous usages for the capabilities of the subject system and method. For example, in a context of a distributed node-local caching tier for HPC (High Performance Computing) environments, applications can allocate (or reserve) storage partitions on the NANVMs for persistence of their data sets. Before the target application initiates the execution, NANVM partitions 38 are allocated to meet the applications data requirements (including capacity, global bandwidth/latency, node-local bandwidth/latency, and the duration of the partitions allocation/reservation).

The target application 29 may migrate data 40, 42 (or data slices $44_1, \ldots, 44_n$) into the respective partitions 38 (or $38_1, 38_2, \ldots, 38_n$) pre-allocated in the NANVM devices 20 from an external storage system 48, and it may use the data-structure data-model aware Data Migration facility 34 to optimize data placement on the NANVM partitions 38. Data shuffling is not required for this routine.

For generating the optimization routine for optimized allocation of the storage partitions and storage of the data 40, 42, $44_1, \ldots, 44_n$ in the storage partitions 38, $38_1, \ldots, 38_n$, respectively, the Data migration unit 34 is provided with capability to analyze the Runtime characteristics, geometry and data model of the data sets (files) 40, 42, to generate a command 49 corresponding to the partitions allocation optimization strategy, and communicate the optimization command 49 to the Partition/Allocator Manager 21, which, in turn, allocates the storage partitions 38, $38_1, \ldots, 38_n$ according to the optimized strategy.

Since the NANVM partitions 38 are reserved on a per-application basis and are not physically attached to an application host (compute node) 12, data transfers to storage partitions 38 in the NANVM devices 20 and are not likely to impact the execution of other applications (for example, by stealing capacity from other applications). The application hosts (client hosts, compute nodes) 12 are chosen for the target application execution by the Resource Manager (also referred to herein as Scheduler, or Reservation system) 37. The Resource Manager Scheduler 37 (shown in FIG. 2) is configured to efficiently schedule target applications 29 or the application hosts 12 to maximize the number of applications completed, and to keep the utilization of the application hosts 12 as high as possible.

The data 40, 42, and $44_1, \ldots, 44_n$ are migrated to the storage partitions 38, and $38_1, \ldots, 38_n$, respectively, before the application hosts 12 are allocated for the target application 29 without impeding the execution of other applications.

Specifically, data sets (files, object slices) are placed on the storage partitions 38 allocated to the target application 29 before the application execution resources 50 are chosen for the target application 29 execution. Once the application executions resources 50 are selected, the storage resources (partitions 38 in the NANVM devices) are mapped to the application execution resources 50 in the Global Data Index Sub-System 30.

Figure 6:
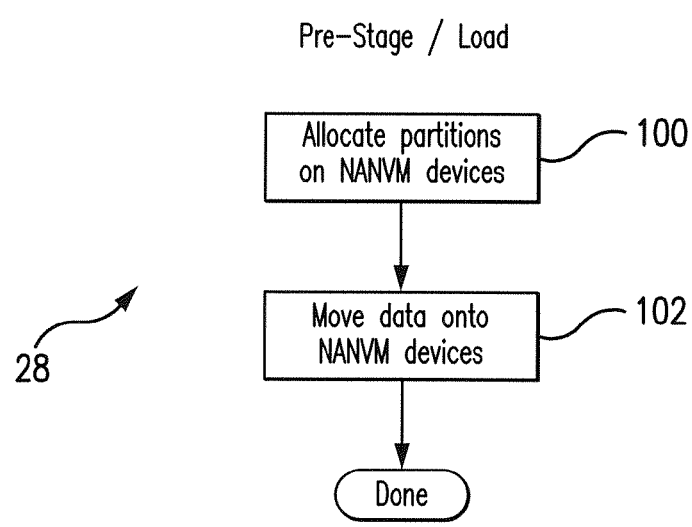
FIG. 6 is a flow chart diagram of the Pre-Stage/Load phase of the subject caching routine.

In the pre-stage phase of the subject routine, shown in FIG. 6, when the subject caching routine moves data to the NANVM partitions, the target application 29 is queued, meaning it is waiting for the Resource Manager/Scheduler 37 to allocate the application host 12 to execute the target application 29. Upon the application host 12 being appointed (i.e., the Resource Manager/Schedule 37 directs to where the target application will execute), the appointed host 12 "mounts to" or accesses the NANVM partitions 38 across the network 14, and begins performing I/O operation. Upon the Resource Manager/Scheduler allocating the application host 12 for the target application 29, the Global Data Index Sub-System 30, in cooperation with the Partition/Allocator Manager 32, provides the partition map 51 of the Global Data Index Sub-System 30. The partition map 51 contains the mapping between the appointed host 12 and the storage partitions 38. The clients 12 of the Global Data Index service 30 can establish the "mounts"/connections to the NANVM devices as needed in accordance with the partition map 51, providing they have valid credentials and satisfactory computing capabilities.

Once the data is loaded (or pre-staged) in the partition 38 in the Pre-stage/Load phase, as shown in FIG. 6, the target application 29 is mapped onto the application host 12, and the NANVM partition(s) 38 is (are) mapped/mounted to the application host 12 by the Global Data Index Sub-System 30.

Applications 29 query the Global Cache Index Sub-System 30 to determine the target storage, i.e., the location of data 40, 42, $44_1, \ldots, 44_n$ within the partitions 38, $38_1, \ldots, 38_n$, and subsequently access (read or write) to the partitions 38 ($38_1, \ldots, 38_n$) as needed.

Multiple modes for indexing partitioned data are contemplated in the subject system 10. For example, an online mode would enable global visibility of the data across client "mounts" at the cost of performance/scalability. Alternatively, a disconnected mode can be used which would force local-visibility of the data while enabling linear scalability of the caching layer (tier) of the system.

Upon completion of the target application execution, or the client shutdown, the storage partitions are unmounted.

The subject data recovery is performed during the target application failure or a host failure scenario. During failure scenarios, respective storage partitions associated with the failed application, or the failed application host, are mounted onto another host, i.e., the failover host, providing that the failover host submits valid credentials and capabilities verified by the Global Data Index Sub-System 30 for the access to the data in the corresponding storage partitions. The credentials and capabilities are included in the credential/capability look-up table 46 mapped to the hosts 12 and partitions 38 in the partitions map 51.

Since the partition mapping (partitions map 51) is tracked in the Global Data Index Sub-System 30, the lookup is provided in the sub-system 30 to determine which partitions were mapped to the failed host/application. Upon establishing which partitions were accessible to the failed host and/or application, reassignment is performed to change the "ownership" of the partition to the failover host.

The subject approach is beneficial for usage in HPC computing environments and data intensive computing systems. One of the costliest aspects of the data intensive systems is the migration of data which are to be processed into the system. The data often trickles in from an external storage system and is often replicated (triplicated) read-only for increasing the read performance. Using the subject approach in a "map-reduce"-like context, storage partitions are allocated and reserved on a per-data-set instance and data is loaded into the NANVM partitions. Only one copy of the entire data set needs to be loaded into the NANVM partitions for a number of hosts to be "mounted" onto the same pre-staged partitions for read-only mode of operation.

Additional partitions 54, that are exclusively owned in "read-write" mode of operation, may be allocated/pre-staged and "mounted" on the applications host 12 for storage of the generated results.

The subject system is capable of reducing the amount of data staged into a triplicated data-intensive system while still allowing the same data set to be shared across multiple application hosts. If the NANVM partitions are sized correctly for performance (providing sufficient bandwidth for three application hosts), the reduction in the number of data copies would be unnoticed by the application.

For data-intensive architectures, the present approach enables an efficient function "shipping" system that requires practically no bulk data movement, once data is loaded into the NAS 18. For this scenario, remote data sets on NANVM partitions can be mounted on an application host running the target application. To prevent over-subscription of partitions to hosts, the computation layer can instead "ship" the work units to hosts that are mounted to these partitions. The information for the function "shipping" to another host (or hosts) is determined by querying the Global Data Index Sub-system for the data set-to-partition mapping, and re-assigning the function to another host(s) based on the partition map 51.

Figure 4:
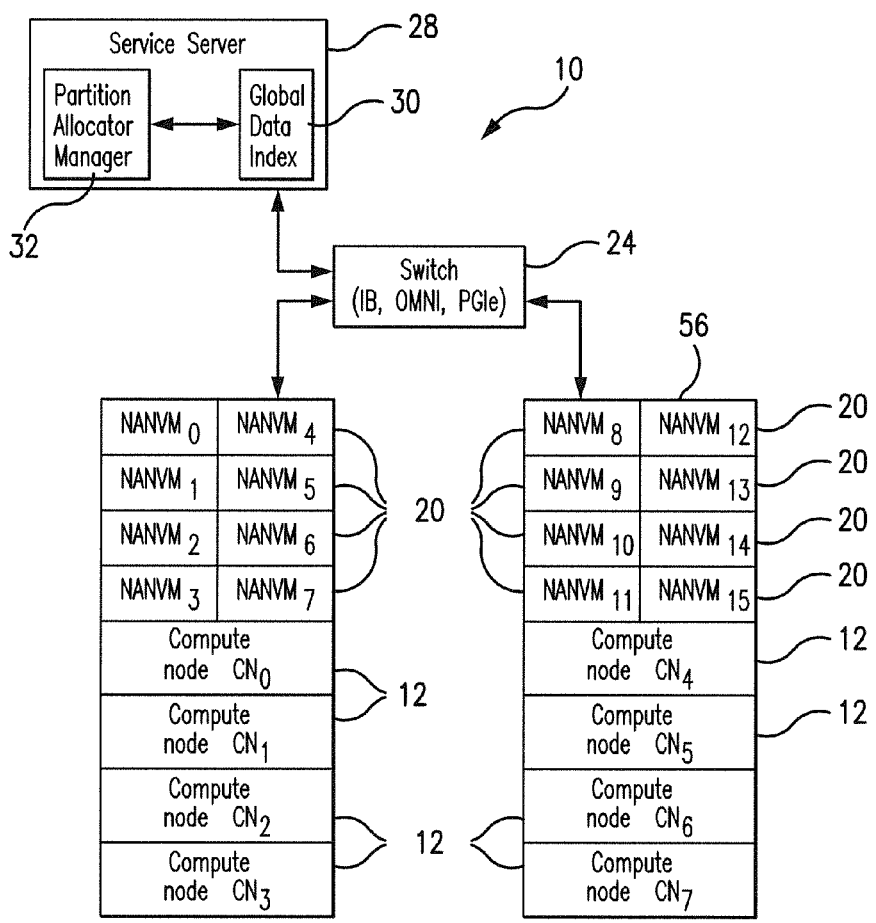
FIG. 4 is a schematic representation of the subject NANVM system architecture where NANVM devices reside in top-of-rack storage enclosures and are deployed on a common network fabric with application hosts.

Referring to FIGS. 2, 3, and 4, in one of the alternative NANVM system architecture designs, the NANVM devices 20 reside in the top-of-rack storage enclosures 56 and are deployed on a common network fabric 14 with the application hosts (compute nodes) 12. The interconnection between the NANVM devices 20 and the compute nodes 12 are provided through the switch 24.

In alternative embodiments, the NANVM devices 20 may be rack-local storage devices, or may be available across-the-data-center to multiple racks of application hosts 12.

Figure 5:
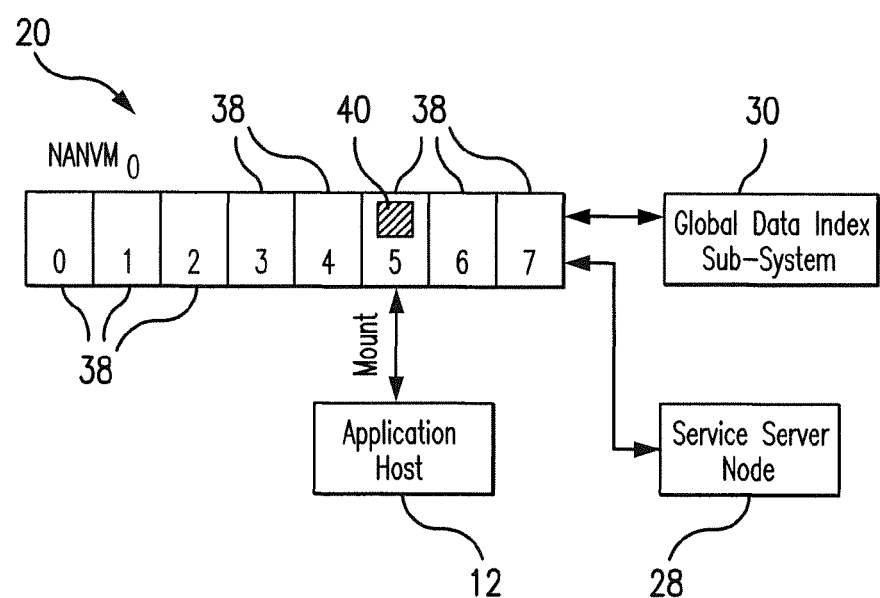
FIG. 5 is a schematic representation of the partitioned NANVM storage.

Referring to FIG. 5, the NAS devices 20 are dynamically partitioned into partitions 38 which are managed by the Global Data Caching Index Sub-System 30.

The subject caching routine is supported by the Global Data Index Sub-System 30, and, in one of the embodiments of the subject system, is supported by the Service Server 28. The Service Server 28 is configured to perform the subject routine.

Figure 7:
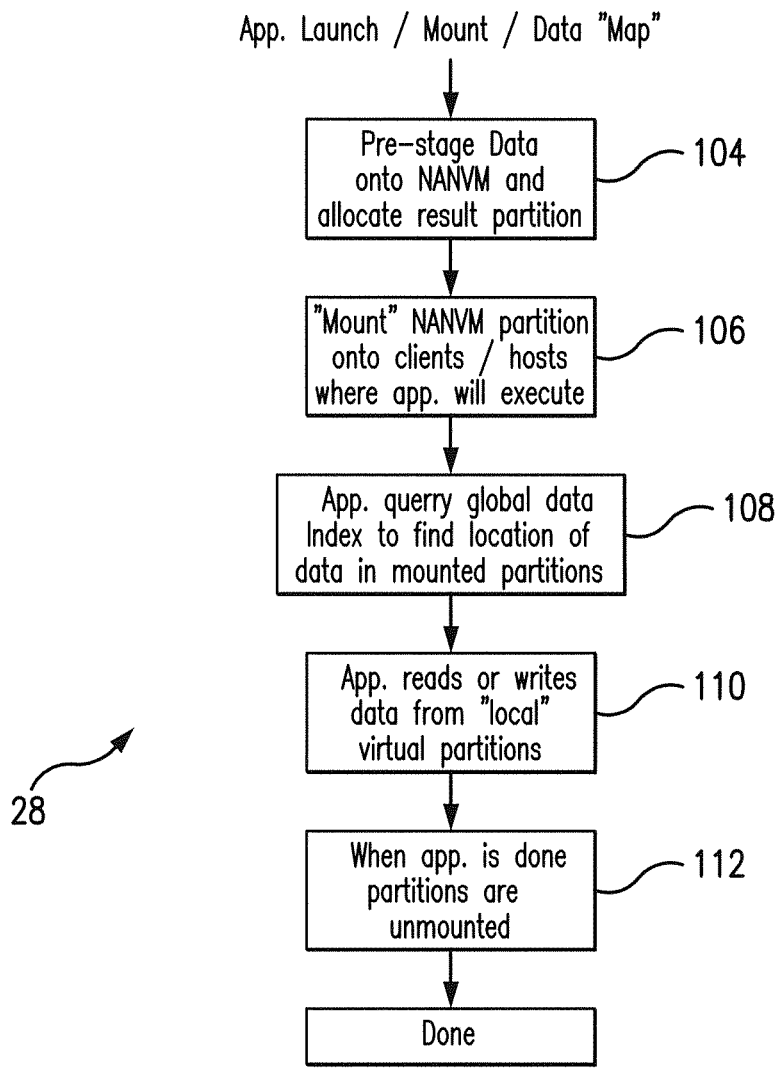
FIG. 7 is a flow chart diagram of the Application Launch/ "Mount"/Data "mapping" phase of the subject caching routine.

Upon receipt of a request from a network user 15 for execution of a desired target application 29, the Service Server 28 initiates the subject caching routine which includes several phases, including the Pre-Stage/Load phase (shown in FIG. 6) and Application Launch/"Mount"/Data "Mapping" phase (shown in FIG. 7).

Referring to FIGS. 5 and 6, loading data into the NANVM devices requires (1) reserving partitions 38 on the NANVM devices 20 that meet the base operational requirements of the target application 29 (such as capacity, performance, duration of the operation, etc.), and (2) mapping/migrating the data sets 40 to the NANVM partitions 38. The Pre-stage/Load phase of operation starts in block 100 "Allocate Partitions on NANVM Devices". From block 100, the logic moves to block 102 "Move Data onto NANVM Devices", where a data set 40 (or sub-objects $44_1, 44_2, \ldots, 44_n$ of the multi-object data 42) move to at least one of the partitions 38 reserved in the NANVM devices.

Providing access for a host (and/or application) to the NANVM partitions requires "mounting" (or addressing) the partitions from the application hosts. Specifically, as shown in FIGS. 5 and 7, the Application Launch/"Mount"/Data "map" phase of the subject routine follows the routine performed in block 104 (where the data 40 is pre-staged onto the allocated partition 38). The logic subsequently moves to block 106 where NANVM partitions are mounted onto clients/hosts 12 where the target application will be executed.

Subsequently, in block 108, the application queries the Global Data Index Sub-System 30 to find the location of the data 40 in the "mounted" partitions 38.

Upon completion of the routine in block 108, the logic flows to block 110 where the application "reads" data from or "writes" data to the "local" virtual partitions. Subsequently, in block 112, upon completion of the target application execution, partitions are unmounted, and the routine is terminated.

Figure 8:
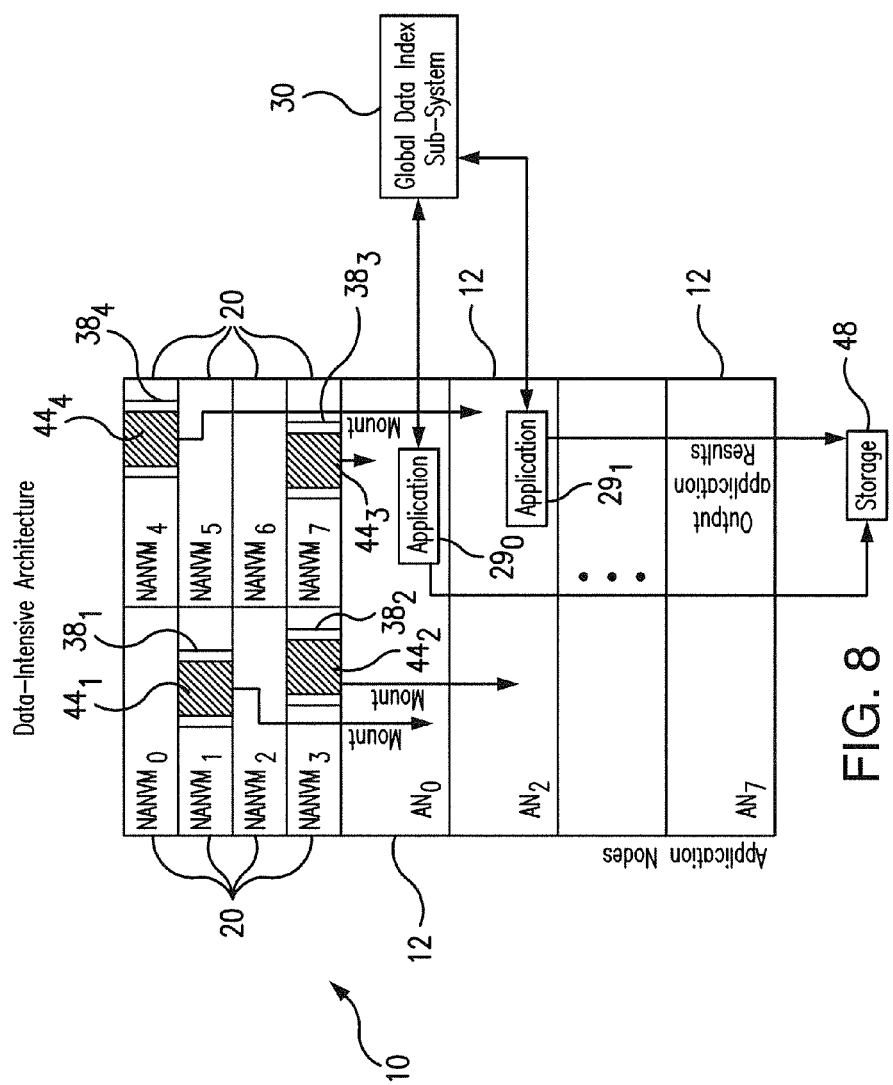
FIG. 8 is a schematic representation of the subject caching routine supported by a data-intensive architecture using the NANVM storage devices.

Referring to FIG. 8, which is representative of the subject routine performed in the data-intensive architecture using the NANVM storage devices, in the pre-stage/Load phase, the users load data slices (for example, $44_1, 44_2, 44_3, 44_4$) into partitions $38_1, 38_2, 38_3, 38_4$ formed in the NANVM storage devices 20.

Subsequently, application nodes 12 are allocated, and partitions $38_1, 38_2, 38_3, 38_4$ are mounted. For example, as shown, the application node $AN_0$ is mounted to partitions $38_1$ and $38_3$ containing the corresponding data $44_1$ and $44_3$, respectively. The application host $AN_1$ is mounted to partitions $38_2$ and $38_4$ containing data $44_2$ and $44_4$, respectively.

In the Global Data Index Sub-System 30, applications nodes and corresponding partitions, as well as application nodes and partitions metadata are mapped.

Subsequently, the target applications $29_0$ and $29_1$ confer with the Global Data Index Sub-System 30 in order to understand data layout and how to output and map computations onto a storage (for example, the external storage) 48.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A method for data caching using Network-Attached storage, comprising:
   (a) operatively connecting a plurality of Compute Nodes into a computer network system, each Compute Node being configured to execute at least one application,
   operatively coupling at least one Network-Attached Storage (NAS) node, at least one application server, at least one Service Node and at least one network user to said computer network system,
   wherein said at least one Service Node is configured with operatively interconnected Partition/Allocator Manager Sub-System, Data Migration Sub-System, and a Dynamic Mounting Sub-System, and
   operatively coupling a Global Data Index Sub-system to said at least one Service Node, said plurality of Compute Nodes, and said at least one NAS node in said computer network system;

(b) issuing and sending, by said at least one network user to said at least one Service Node, a target application request for at least one target application execution;

(c) responsive to receipt of said target application request, dynamically allocating, by said Partition/Allocator Manager Sub-System, a plurality of storage partitions in said at least one NAS node;

(d) migrating, by said Data Migration Sub-System, a data set required for said at least one target application execution into at least one storage partition from said plurality thereof allocated in said at least one NAS node;

(e) creating a partition map by said Global Data Index Sub-System, and mapping said data set to said at least one storage partition in said partition map;

(f) selecting a respective at least one Compute Node from said computer network system for execution of said at least one target application;

(g) operatively coupling, by said Dynamic Mounting Sub-System, said respective at least one Compute Node to said at least one storage partition containing said data set; and (h) executing said at least one target application by said respective at least one Compute Node using said data set stored in said at least one storage partition allocated in said at least one NAS node.

2. The method of claim 1, further comprising:
in said step (c), analyzing characteristics, geometry, and data model of said data set by said Data Migration Sub-System;
generating, by said Data Migration Sub-System, an optimization routine for optimized allocation of said plurality of storage partitions and storage of said data set therein in accordance with said characteristics, geometry and data model of said data set;
transmitting a command corresponding to said optimization routine to said Partition/Allocator Manager Sub-System; and
allocating said plurality of storage partitions, by said Partition/Allocator Manager Sub-System, in accordance with said optimization routine command.

3. The method of claim 2, further comprising:
in said step (f), requesting, by said at least one Service Node, security credentials of said at least one respective Compute Node, and submitting said security credentials to said Global Data Index Sub-System; and
in said step (g), allowing access for said at least one respective Compute Node to said at least one storage partition if said security credentials are valid.

4. The method of claim 3, further comprising:
in said step (f), requesting, by said at least one Service Node, information on the computing capabilities of said at least one respective Compute Node;
transmitting said information to said Global Data Index Sub-System; and
in said step (g), allowing access for said at least one respective Compute Node to said at least one storage partition if said computing capabilities correspond to said at least one target application requirements.

5. The method of claim 4, further comprising:
in said step (f), selecting another at least one Compute Node from said plurality thereof for accessing said at least one storage partition based on the security credentials and the computing capabilities of said another at least one Compute Node if said at least one respective Compute Node ceases operating.

6. The method of claim 1, further comprising:
subsequently to said step (h), disconnecting said at least one respective Compute Node from said at least one storage partition when said at least one target application has been executed.

7. The method of claim 1, further comprising:
in said step (g), disconnecting said at least one respective Compute Node from said at least one storage partition after said at least one respective Compute Node terminates the operation.

8. The method of claim 2, further comprising:
in said step (c), generating said optimization routine for allocation of said plurality of storage partitions in said NAS node based on said at least one target application data requirements, wherein said data requirements include memory capacity of said at least one storage partition, global bandwidth/latency, local bandwidth/latency of said at least one respective Compute Node, duration of said at least one storage partition allocation/reservation, and combinations thereof.

9. The method of claim 2, further comprising:
in said step (f), mapping said at least one target application and said at least one storage partition to said at least one respective Compute Node in said partition map generated by said Global Data Index Sub-System.

10. The method of claim 9, further comprising:
in said step (g), prior to coupling said chosen at least one respective Compute Node to said data set, querying, by said at least one Service Node, said Global Data Index Sub-System to determine a location of said data set in said at least one NAS node.

11. The method of claim 1, further comprising:
during failure situations, including failure of said at least one target application or of said at least one respective Compute Node, finding by said Global Data Index Sub-System, said at least one storage partition mapped to said at least one respective Compute Node; and
reassigning said at least one storage partition to another at least one Compute Node.

12. The method of claim 1, further comprising:
in said step (f), allowing an access to said at least one storage partition for at least two Compute Nodes of said plurality thereof for read-only I/O operations.

13. The method of claim 1, further comprising:
in said step (c), allocating said at least one partition on a per-data-set basis, and
in said step (d), migrating a single copy of said data set to said at least one NAS node.

14. The method of claim 1, further comprising:
in said step (c), allocating additional storage partitions for storage of data results generated by said at least one respective Compute Node during said at least one target application execution; and
coupling said additional storage partitions to said at least one respective Compute Node for being used in read-write modes exclusively by said at least one respective Compute Node.

15. The method of claim 1, further comprising:
in said step (c), allocating said plurality of storage partitions in said at least one NAS node on a per-target-application basis, and
when said target application is a file-per-process application,
allocating, in said step (c), clustered storage partitions, and
migrating, in said step (d), said data set, as a single file, to said clustered storage partitions.

16. The method of claim 15, further comprising:
when said data set includes a number of sub-objects,
slicing, in said step (d), said data set into said number of sub objects, and
mapping, in said step (e), each sub-object to a respective storage partition for said plurality thereof.

17. A data migration system, comprising:
a network of a plurality of interconnected client nodes, at least one client node being configured for execution of at least one target application,
at least one Network-Attached storage (NAS) node operatively coupled to said network of client nodes, wherein said at least one NAS node includes an array of Non-Volatile Memory (NVM) devices arranged in rows and tiers,
at least one network user operatively coupled to said network of client nodes,
at least one application server operatively coupled to said network of client nodes and configured to support at said least one application,
at least one Service Node operatively coupled to said network of client nodes, said at least one application server, and said at least one NAS node, wherein said at least one Service Node is configured with operatively interconnected Partition/Allocator Manager Sub-System, Data Migration Sub-System, and Dynamic Mounting Sub-System, and
a Global Data Index Sub-System operatively coupled to said at least one NAS node, said network of client nodes, and said at least one Service Node;
a plurality of virtual storage partitions dynamically allocated in said at least one NAS node by said Partition/Allocator Manager Sub-system based on said at least one data requirements target application requested by said at least one network user, wherein said data requirements include memory capacity of said storage partitions, global bandwidth/latency, local bandwidth/latency of said at least one client node, duration of said storage partitions allocation/reservation, and combinations thereof,
an external data storage containing at least one data set required for said at least one target application execution, wherein said Data Migration Sub-System is configured to migrate said at least one data set from said external storage to said at least one NAS node for storage in at least one storage partition allocated in said at least one NAS node in an optimized format controlled by said Data Migration Sub-System in accordance with characteristics, geometry and data model of said data set;
a Resource Manager/Scheduler Mechanism operatively coupled to said network and said at least one Service Node, and configured to choose at least one client node from said network for execution of said at least one target application based on security credentials and the computing capabilities of said at least one client host,
wherein said Dynamic Mounting Sub-System is operatively coupled to said Compute Nodes, said at least one NAS node, and said Resource Manager/Scheduler Mechanism, and is configured to operatively couple said chosen at least one client node to said at least one storage partition containing said data set, and
wherein said Global Data Index Sub-System is configured to generate a partition map containing mapping of said data set to said at least one storage partition, mapping of said at least one target application to said at least one client node, and mapping of said at least one storage partition to said at least one client host.

18. The system of claim 17, wherein said at least one Service Node is further configured to determine said at least one storage partition mapped to said at least one client host, and reassigning said at least one storage partition to another at least one client host during failure situations, including failure of said target application or failure of said at least one client host.

19. The system of claim 17, wherein said at least one Service Node is further configured for allocating additional storage partitions for storage of data results generated by said at least one client host during said target application execution, and
for coupling said additional storage partitions to said at least one client host for exclusive usage in read and write modes of operation.

20. The system of claim 17, wherein said network has a data intensive architecture or high performance computing architecture.

* * * * *